United States Patent [19]

Hite et al.

[11] Patent Number: 5,805,974
[45] Date of Patent: Sep. 8, 1998

[54] METHOD AND APPARATUS FOR SYNCHRONIZING COMMERCIAL ADVERTISEMENTS ACROSS MULTIPLE COMMUNICATION CHANNELS

[76] Inventors: Kenneth C. Hite, 3 Center Knolls, Bronxville, N.Y. 10708; Walter S. Ciciora, 45 Hulls Farm Rd., Southport, Conn. 06490-1027; Tom Alison, 280 Barrataria Dr., St. Augustine, Fla. 32086; Robert G. Beauregard, 66 E. Parkway, Apt. 1 J, Scarsdale, N.Y. 10583

[21] Appl. No.: 512,542

[22] Filed: Aug. 8, 1995

[51] Int. Cl.[6] ............................. H04H 1/00; H04N 7/10
[52] U.S. Cl. ............................. 455/3.2; 348/9; 348/10; 455/6.2
[58] Field of Search ................. 348/6, 9, 10, 500, 348/563, 907, 722, 723, 724, 725, 726, 8; 455/3.1, 3.2, 4.1, 4.2, 6.1, 6.2

[56] References Cited

U.S. PATENT DOCUMENTS

| Re. 33,808 | 1/1992 | Wright, Jr. | 348/9 |
|---|---|---|---|
| 4,331,973 | 5/1982 | Eskin et al. | 348/13 |
| 4,331,974 | 5/1982 | Cogswell et al. | 348/9 |
| 4,404,589 | 9/1983 | Wright, Jr. | 348/9 |
| 4,814,883 | 3/1989 | Perine et al. | 348/460 |
| 5,099,319 | 3/1992 | Esch et al. | 358/86 |
| 5,155,591 | 10/1992 | Wachob | 348/9 |
| 5,200,822 | 4/1993 | Bronfin et al. | 348/460 |
| 5,231,494 | 7/1993 | Wachob | 348/385 |
| 5,424,770 | 6/1995 | Schmelzer et al. | 348/9 |
| 5,495,283 | 2/1996 | Cowe | 348/9 |
| 5,515,098 | 5/1996 | Carles | 348/8 |
| 5,652,615 | 7/1997 | Bryant et al. | 348/9 |
| 5,661,516 | 8/1997 | Carles | 348/8 |

*Primary Examiner*—Mark R. Powell
*Assistant Examiner*—John W. Miller
*Attorney, Agent, or Firm*—Ostrolenk, Faber, Gerb & Soffen, LLP

[57] ABSTRACT

A satellite uplink/studio system has timing means coupled therewith for precise commercial timing such that prerecorded commercials are simultaneously started with sufficient precision to appear simultaneously to viewers changing channels.

28 Claims, 7 Drawing Sheets

METHOD AND APPARATUS FOR SYNCHRONIZING COMMERCIAL ADVERTISEMENTS ACROSS MULTIPLE COMMUNICATION CHANNELS

BACKGROUND OF THE INVENTION

Cable operators sell advertising at a substantial discount compared to the broadcast networks because of the fragmented nature of the cable viewing situation. Cable viewers can "channel surf" and avoid commercials. While the total number of advertising spots in a cable system is very large, the number of viewers per channel is relatively small. This makes for inefficient advertising and results in a substantial lost opportunity for the cable industry.

The sale of commercials is done on the basis of a "cost per thousand" viewers (CPM) parameter. The CPM for broadcast networks is typically more than double—in some cases triple—that of cable programmers. Advertisers pay on a sliding scale per reached viewer. A program or network which reaches larger numbers of viewers not only gets more revenue because the number of viewers is larger but also gets more revenue per viewer because of the efficiency of reaching a larger audience at one time.

A series of steps are proposed in this invention to increase the effectiveness of the advertising on cable and similar multichannel media and raise the revenue potential of the advertising spots for the programmer and cable operator.

SUMMARY OF THE INVENTION

Accordingly, it is an object of this invention to provide a system and process which will solve the problems described above and overcome the disadvantages associated with the prior art systems described above.

It is another object of the present invention to provide a process by which many, most, or all of the cable programmers synchronize their programming and insert the same commercial simultaneously. With this invention, the number of viewers reached is approximately the same as the number reached by the major over-the-air broadcast networks. The trend in viewing is away from the networks and to the cable programmers. In the near future, the sum of cable programming viewers will exceed the number of viewers watching any of the networks. Using this invention, the cable industry will be able to increase its CPM to a value equal to or exceeding that of the networks. This will substantially increase the profitability of advertising on cable.

A full "road block" would be a situation in which all channels had the same commercial at the same time. No matter what channel the viewer tuned to, he would see the same commercial. This was occasionally done with approximate timing when there were just three networks. With the addition of more channels, particularly on cable, the "road block" approach has become nearly impossible to accomplish. There are technical reasons why this will become even more difficult in the future. It is a further object of the invention to provide a system and process which will overcome these problems and make a partial road block feasible.

Since the same commercial will appear on a large number of cable programmer channels, a partial "road block" will be established. That is, a viewer switching between participating cable programmer channels will see the same commercial no matter which channel he chooses. The only way to escape the commercial is to go to a non-participating broadcast or cable channel or a channel which has no commercials. In principle, the broadcast networks can participate creating an even more comprehensive "road block".

It is important to realize that "cable programming" forms the backbone of the telcos, DBS, and other media entry into the video business. The 1992 Cable Act required the cable industry to surrender its programming to its competitors. Thus this method also applies to the delivery of programming over these other media. It will be understood by those skilled in the art that this invention can be applied to any broadband media; i.e. any media which simultaneously delivers multiple channels. It will also be understood that this invention can be applied across several media so that the "road block" applies not only to attempts to switch channels within one media but also to attempts to switch to other media. In this case, a viewer switching from one broadband media, such as cable, to another broadband media, such as DBS, Video Dialtone, etc. etc. would see the same commercial.

The fundamental principles involved in this invention are the synchronization of the time slots into which the commercials are inserted, the synchronization of the commercials, and the distribution of common timing information. Two fundamental ways of synchronizing commercials are to either make them simultaneously available to all channels or to download them and start them simultaneously. Downloading can be accomplished via a satellite signal, land lines of fiber, coax, twisted pairs, or other media, radio waves, or even physical movement of media which stores the commercial. Simultaneously starting the commercials can be accomplished in two ways. Either the information concerning the start time is downloaded and stored so that the equipment knows when to initiate the commercial or a commercial initiation command can be simultaneously delivered to all locations. In principal, these functions can be accomplished at either the display site or home, the cable headend, the satellite uplink facility, or the production facility. Clearly, the cost of equipment required is minimized if these functions are located in places where signals are concentrated.

In general, multiple Programming Facilities feed each Production Facility. Multiple Production Facilities feed each Satellite Up Link Facility. Large numbers of cable headends are fed from each satellite. Large numbers of receive sites are fed from each headend. While any of these facilities can be used to implement the invention, the most economies are enjoyed if the invention is implemented at the Satellite Uplink Facilities or the Production Facilities.

The National Synchronization Center provides signals appropriate to the implementation chosen. The National Synchronization Center may provide the timing information. The National Synchronization Center may be the source of simultaneously delivered commercials. The National Synchronization Center may be the source of the command which initiates commercials.

Further improvements include the monitoring and logging of compliance and participation, the compensation for compliance, and an optional receive-site channel access control means to avoid interruptions in commercials appearing on multiple channels during channel changing.

If the timing of the commercials is approximate, there may be some overlap or some gaps in the presentation of the commercial as the viewer switches from channel to channel. If the timing is precise, the overlap or gap is minimized.

In order to increase the precision of the timing of the commercials and the programming which precedes and the programming which follows the commercials, it will be necessary for all of the participating programmers to utilize a common time base. The National Institute of Standards and Technology, NIST, (formerly the National Bureau of Standards, NBS) provides timing information of sufficient accuracy for this purpose. Other sources of timing information are available. It will be appreciated that the absolute correctness of time is not important. It is only important that participating networks are synchronized. The pre-recorded commercials are delivered in advance and contained in appropriate storage means such as magnetic or optical tape or disc or semiconductor or other memory. The pre-recorded commercials are simultaneously started with sufficient precision to appear simultaneous to viewers changing channels.

Simultaneous delivery (via satellite or land link) of the commercials to all participating networks is a way of ensuring that the timing is precise as long as the same number of satellite links is used by all of the networks. Multiple satellite links or several links in cascade should be avoided.

In addition, commercially available time compressor/expanders are available which stretch or squeeze the programming and/or commercial length to fit precisely in the time available. These technologies can be employed to ensure precise slots for the commercials. These technologies are included in commercially available professional video tape machines. They are adaptable to other media as well.

All of these techniques are intended to permit the implementation of the "Cable Network". Most of the techniques do not require the modification of set top boxes. This will allow a rapid deployment. Only the last technique, an optional receive-site channel access control means to avoid interruptions in commercials appearing on multiple channels during channel changing, requires modification of set top box designs. This modification, however, is relatively inexpensive. A "road block" can be established without this improvement, but it will be less effective since the display of the commercial will be interrupted during channel changes.

A Further Improvement

In some circumstances, the nature of the programming will not allow precise timing. In other cases, the nature of the programming cannot be controlled and may at some times be amenable to precise timing and at other times not. A further improvement accommodates this situation. In the further improvement, programmers are provided with a financial incentive to synchronize the commercials and are measured and rewarded according to their willingness and ability to comply. The incentive is based on a formula which is determined by business conditions.

An example is provided. In this example, all participating networks are supplied with precise time signals as above. The networks will precisely synchronize their commercials if this does not disrupt their programming. If a disruption is caused, the precision of the synchronization may be reduced. An important part of this further process is the measurement and logging of the timing of the commercial insertions. This data is relayed to a central point. Statistical data on network viewership is also accumulated. The total number of viewers covered by properly synchronized commercials is tallied and compared with the viewership rates for the broadcast networks. If the total number of viewers of a synchronized commercial is equivalent to that of the top rated broadcast network, the CPM rate used for that broadcast network applies to each complying cable network. The complying network is rewarded with that higher CPM applied to its viewership numbers. Any network which fails to synchronize gets the normal cable CPM for a stand-alone commercial. If the total number of viewers of a synchronized commercial is equivalent to that of the second rated broadcast network, the CPM rate used for that broadcast network applies and each complying cable network is rewarded with that CPM applied to its viewership numbers. Any network which fails to synchronize gets the normal cable CPM for a stand-alone commercial. If the total number of viewers of a synchronized commercial is equivalent to that of the third rated broadcast network, the CPM rate used for that broadcast network applies and each complying cable network is rewarded with that CPM applied to its viewership numbers. Any network which fails to synchronize gets the normal cable CPM for a stand-alone commercial. If the total number of viewers of a synchronized commercial fails to meet some minimum number, the normal cable CPM rates apply to all participants. This is just one example of how the compensation and incentive plan can be structured from a business perspective.

Another Improvement

Depending on the tuner used in the TV, VCR, or set top box, there may be some acquisition time required as the tuner goes from channel to channel. This can result in a noticeable glitch during channel change which interferes with the presentation of the commercial. This problem is aggravated if the channels are scrambled because the descrambler takes additional time to acquire the signal and properly descramble it. In some cases, the total time could be a significant fraction of a second and result in a very noticeable interruption.

The situation becomes even worse if the programming is digitally compressed. This is because the digital decompression circuitry requires time to acquire and process the signal from the new channel. A possible approach for avoiding this problem is to employ two tuners, one for the current channel and one for the next channel. This adds significant expense. If the two channels are scrambled, two descramblers are necessary in addition to the tuners to make a "seamless transition". This is very expensive. If the two channels are digitally compressed, two decompression circuits will also be necessary to make a "seamless transition". This is extremely expensive.

An approach proposed in this invention is to download instructions to the receiver to indicate the channels which are carrying the same commercial. If the viewer intends to switch from one channel to another, both of which have the same commercial, the channel indicator changes, but the tuner, and/or descrambler, and/or Decompression circuits remain on the current channel until the commercial is completed. Then, the tuner, and/or descrambler, and/or Decompression circuits go to the new channel. In this way an interruption in the display is avoided during the commercial. This process continues as the viewer goes from channel to channel unless one of the channels selected does not have the "road block" commercial. This part of the invention is inexpensively implemented in the microcomputer which controls the tuner and adds very little cost to the set top box or TV or VCR.

In the case where channels are being scanned and one of the channels does not have the "road blocked" commercial, the microprocessor can determine if a scanning operation is underway and the channel without the "road blocked" commercial will be spanned before its signal can be acquired. In that case, the scanning process continues without changing the channel and the commercial continues without interruption.

The Addressable Advertising invention for delivering targeted advertisements to consumers may be combined with the Road Block to increase advertising effectiveness even further. Addressable Advertising has been disclosed in patent application SN 08/354,620 filed Dec. 13, 1994 entitled Apparatus and Method for Targeting Advertisements to Consumers. Addressable Advertising can be implemented in three ways. One way is by switching between simultaneously delivered channels to deliver advertising appropriately targeted to the viewer. Another implementation downloads and stores advertisements in advance and selects the appropriate advertisement from those stored locally. Yet another implementation causes the appropriate advertisement to be selected from a server at a central site and switched onto the line connecting the subscriber. When the Road Block is also implemented, the same advertisement appears independent of which participating channel is watched.

In summary, with the present invention, advertising can be presented in a "partial road block" or even a full "road block" fashion increasing the value of advertising to the advertiser, the programmer, the broadband signal delivery system, and reducing the annoyance to viewers of commercials flashing by. Methods of accomplishing this without the need for changes in set top boxes is presented. A more effective and pleasing technique is described for those situations where scrambling and/or digital compression are employed. These methods also apply to the artifacts which maybe present when a tuner takes a visible amount of time to acquire a new channel.

BRIEF DESCRIPTION OF THE DRAWINGS

The attainment of the foregoing and related objects, advantages and features of the invention should be more readily apparent to those skilled in the art, after review of the following more detailed descriptions of the invention, taken together the drawings, in which.

DETAILED DESCRIPTION OF THE PREFERRED EMBODIMENTS

Figure 1:
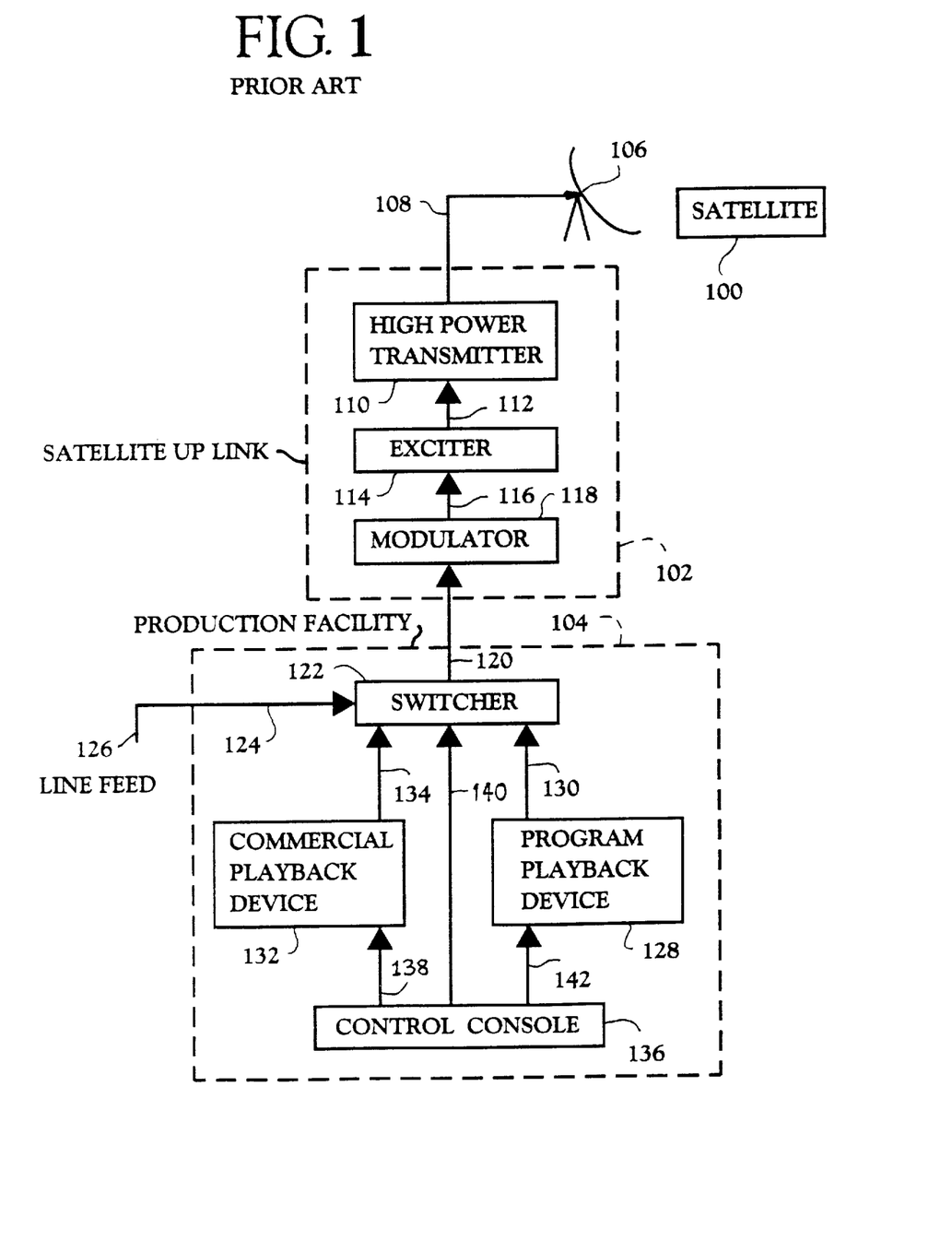
FIG. 1: A satellite uplink/Production Facility prior to the invention.

Turning now to the drawings, more particularly to FIG. 1, there is shown a block diagram of a satellite uplink/Production Facility prior to the invention comprising three major elements. The first element is a satellite 100 fed from a Satellite Uplink 102 which is in turn fed from a Production Facility 104. The Production Facility 104 and the Satellite Uplink 102 may be co-located or separated by an arbitrary distance. The satellite 100 is fed with signals from a satellite antenna 106 or dish, fed with connection 108 from the High Power Transmitter 110. The satellite antenna 106 and the High Power Transmitter 110 are fed via connection 112 from the exciter 114 which has the correct signal level and impedance levels to properly operate the High Power Transmitter 110. The exciter 114 is fed via connection 116 from the modulator 118. All of these components are commonly available and used in satellite practice. They are familiar to those skilled in the satellite transmission arts.

The Production Facility 104 comprises a switcher 122 connected to the satellite uplink via a connection 120. This connection may be just a short connection from one part of the facility to another or it may consist of a transmission path spanning an arbitrary distance. In some cases it may be a satellite or microwave link as well. If the distances are substantial, fiber optic links may be used. The switcher 122 combines various video and audio signals from a variety of sources under the influence of the control console 136. The control console 136 may be automatic, computer controlled, or manually operated, or operated under a combination of modes depending on the program material or the time of day. The switcher 122 selects between such signal sources as one or more line feeds 124 connecting to one or more external signal sources 126, one or more program playback devices 128 coupled to the switcher 122 by connection 130, one or more commercial playback devices 132 coupled to the switcher 122 by connection 134. The control console 136 influences the program playback device 128 via connection 142. The control console 136 influences the commercial playback device 132 via connection 138. The external signal sources 126 could be other Production Facilities, other satellite links, other remote locations where events such as sporting games, news stories, etc, are covered. The program playback device 128 and the commercial playback device 132 can consist of tape machines, optical or magnetic disk machines, semiconductor or other storage media depending on the technology currently available and practical at the time the invention is practiced.

Figure 2:
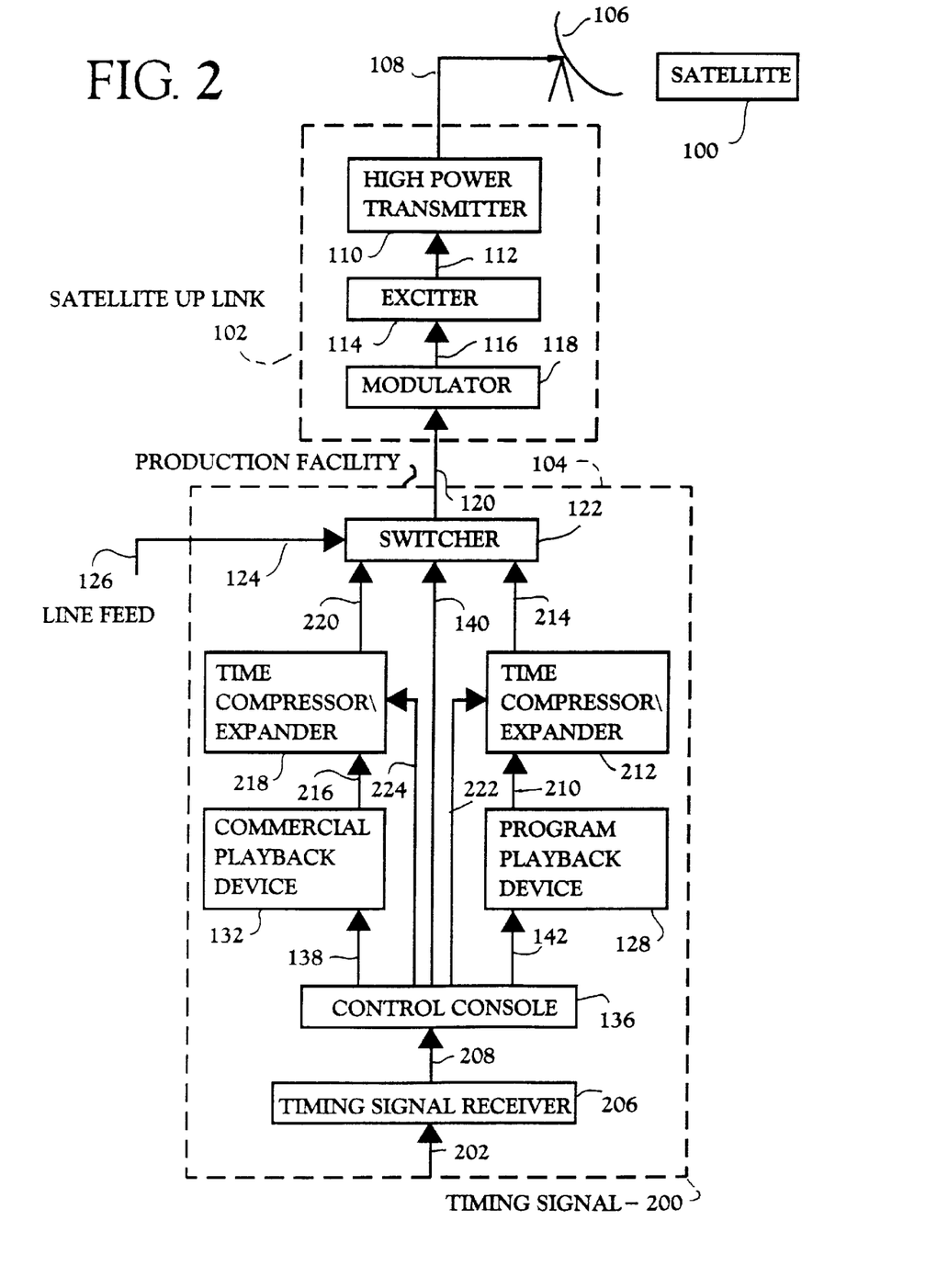
FIG. 2: A satellite uplink/Production Facility with precise commercial timing and optional signal time compression/expansion.
Figure 2A:
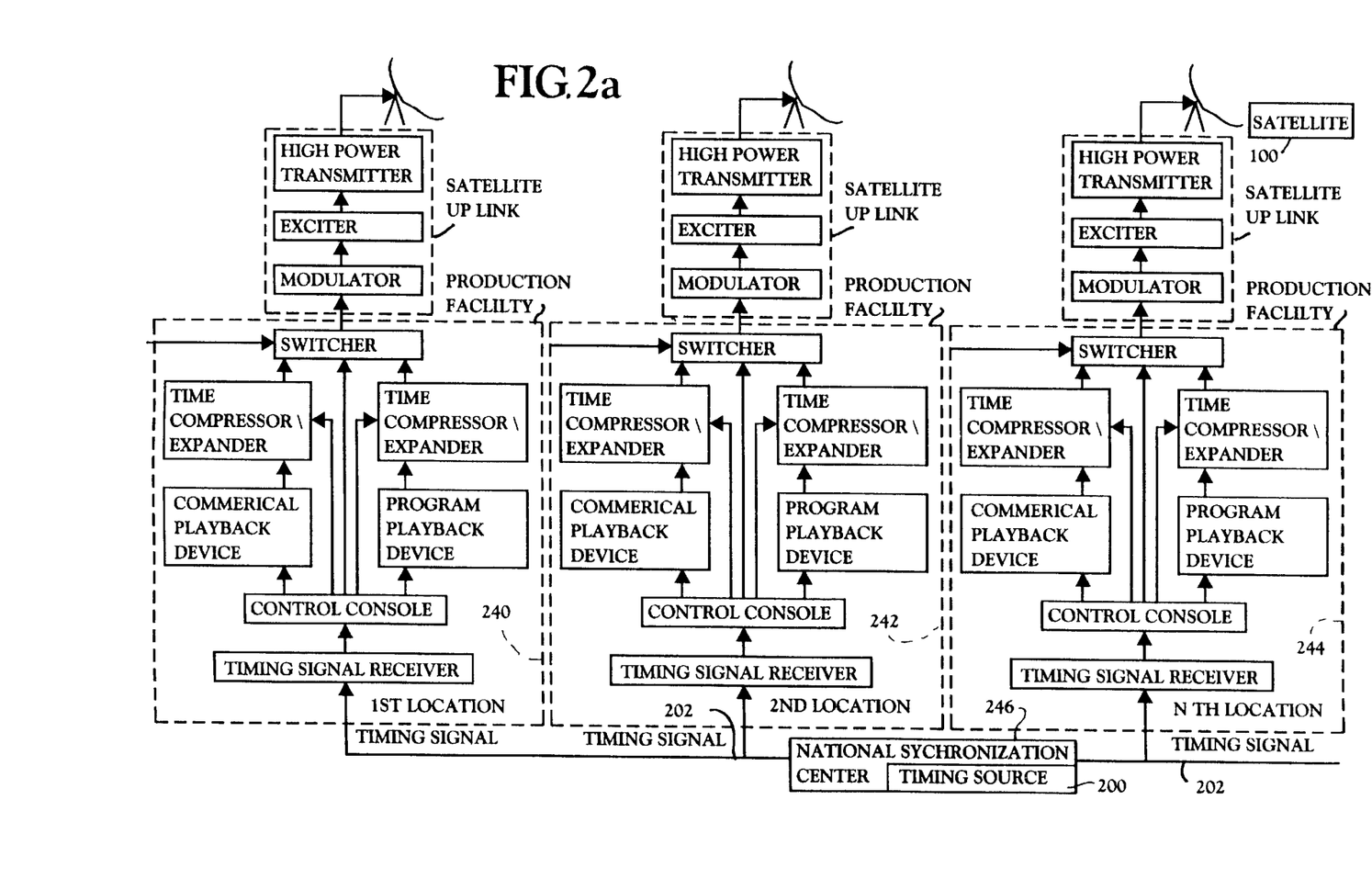
FIG. 2a: Multiple locations are synchronized.

FIG. 2 shows a block diagram of the satellite uplink/Production Facility system of FIG. 1 augmented with precise commercial timing and optional signal time compression/expansion. In FIG. 2a, the facility of FIG. 2, 240, is replicated in multiple locations 242 and 244, to demonstrate the process of synchronization. A common timing source 200 is located in the National Synchronization Center 246 and is distributed by connection 202 to multiple satellite uplink/Production Facility sites. The connection 202 could be a satellite link, wire line links, or a radio transmission. The common timing source 200 could be derived from the National Institute of Standards and Technology, NIST, (formerly the National Bureau of Standards, NBS) or any other source. If a common source 200 is used, the absolute precision of that source is unimportant. The important factor is that all systems are synchronized by the same source. The connection 202 must have insignificant differences in transmission times to the various satellite uplink/Production Facility systems to avoid the introduction of different delays. For example, if connection 202 involved satellite distribution and some satellite uplink/Production Facility system sites received the signal via one satellite link while others required two or more links, the transmission delays to the various sites would be sufficiently different to upset the synchronization and viewers would be disturbed by the differences from channel to channel. At each satellite uplink/Production Facility system site, a Timing Signal Receiver 206 receives the common timing source signal 200 via connection 202 and processes it for further use at the site. In most cases the control console 136 will receive the timing signal via connection 208 from the Timing Signal Receiver 206. The control console 136 then operates as before, but with greater timing precision. An optional Time Compressor/Expander 212 can be used to process the signals from the Program Playback Device 128 by coupling it to the Program Playback Device 128 with connection 210 and coupling it to the Switcher 122 with connection 214. The optional Time Compressor/Expander 212 is coupled to the Control Console 136 by connection 222. An optional Time Compressor/Expander 218 can be used to process the signals from the Commercial Playback Device 132 by coupling it to the Commercial Playback Device 132 with connection 216 and coupling it to the Switcher 122 with connection 220. The optional Time Compressor/Expander 218 is coupled to the Control Console 136 by connection 224. The optional Time Compressor/Expanders 212 and 218 take signals previously loaded into them and play them back at appropriate speeds to precisely fit a time constraint. If the original signal did not fully fit the time allotted, the Time Compressor/Expanders 212 and 218 would play back more slowly to expand the time of playback. Conversely, if the original signal was too long to fit the time allotted, the Time Compressor/Expanders 212 and 218 would play back more quickly to shorten the time of playback. These optional Time Compressor/Expanders 212 and 218 would not be necessary if Program Playback Device 128 and Commercial Playback Device 132 had sufficient variable playback speed features.

Figure 2B:
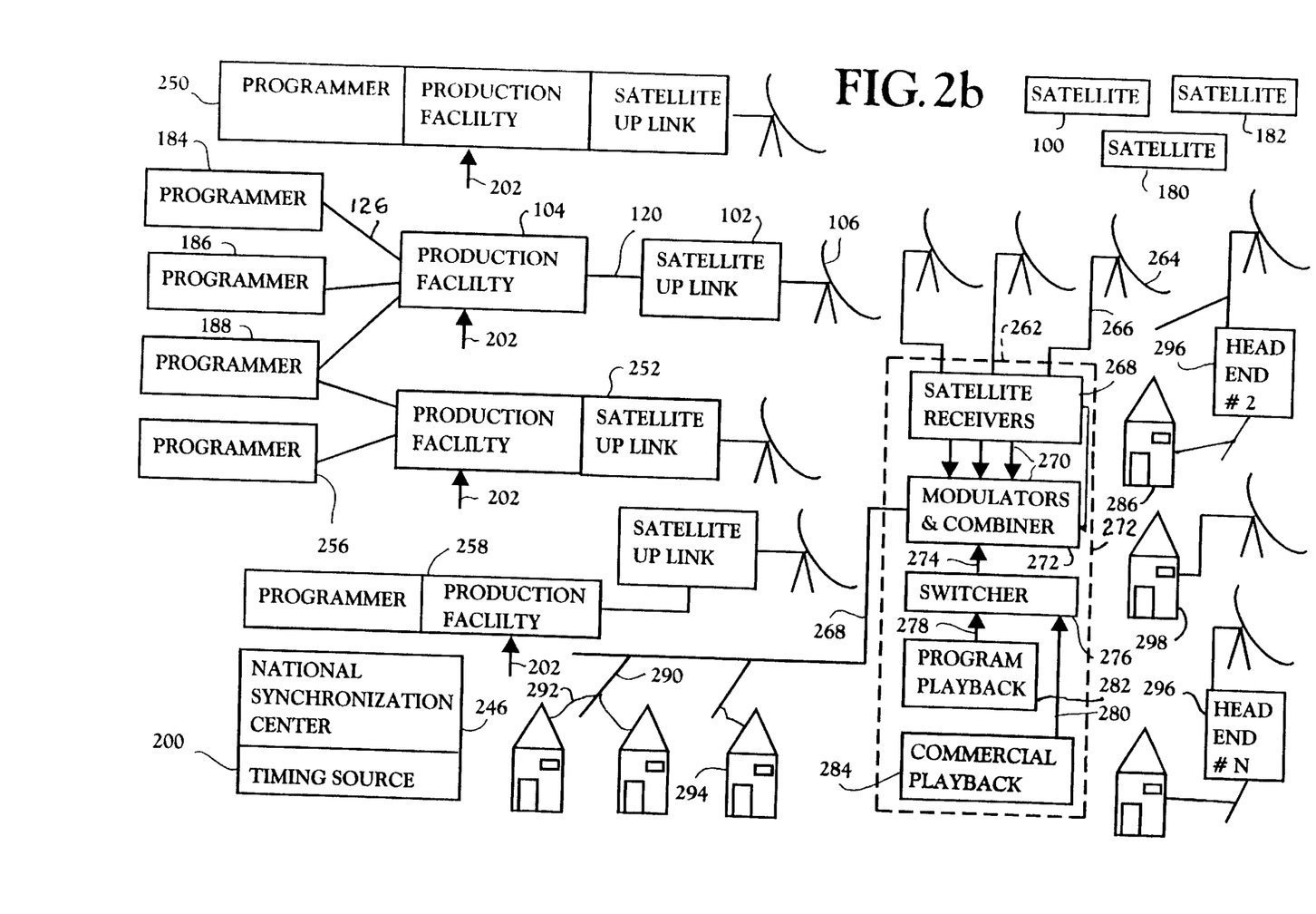
FIG. 2b: Multiple facilities, sources, and receive systems and sites.

FIG. 2b shows multiple facilities sources, and receive systems and sites. In an actual application, multiple satellites 100, 180, and 182 may be employed. Many more satellites may be involved. Signals for those satellites may come from multiple facilities similar to the facilities of FIG. 2 and FIG. 2a all under the control of a National Synchronization Center 246. In the figure, multiple Programmers 184, 186, 188 convey their signals to a Production Facility 104 which processes the signals according to the methods of this invention under the influence of signals conveyed via connection 202 from the National Synchronization Center 246. The processed signals are conveyed via connection 120 to Satellite Up Link 102 which then uses antenna 106 to send the signals to one or more of the satellites. In this portion of the Figure, the Programmers 184, 186, and 188, the Production Facility 104 and the Satellite Up Link 102 and even the antenna 106 may be located at arbitrary distances from each other and connected by appropriate means. Multiple such facilities are used in the cable industry. Some such as facility 250 are all located in one place. Others such as Facility 252 have the Production Facility and the Satellite Up Link and antenna located in one place and the Programmer 256 at some distance. In some cases, a Programmer 188 may feed more than one Production Facility 104 and 252. In other situations, the Programmer and Production Facility 258 may be combined and the Satellite Up Link 260 located elsewhere. These various components, Programmer, Production Facility, and Satellite Up Link may also have different ownership or may be owned by the same entity. The signals from the multiple satellites 100, 180, and 182 are received by multiple Head End Facilities 262, and 296 for processing and distribution to end users in homes 294. Some homes 298 may receive signals directly from the satellites 100, 180, and 182 in a Direct Broadcast Service. When the Head End 262 receives the signals, multiple antennas 264 are used to feed Satellite Receivers 268 via connections 266. The Satellite Receivers 268 select the appropriate frequency, demodulate the signals and bring them down to a common frequency and then convey them via connection 270 to a collection of Modulators and a combiner 272 where they are put on appropriate television channels and combined into a broadband signal which is conveyed by fiber cable or coaxial cable or twisted pair cable or radio frequency transmission or other means 268 to neighborhoods where subscribers reside. In the neighborhood, the signals are put on distribution lines 290 which bring the signals outside residences 294. A "drop line" 292 conveys the signal to the residence 294. At the Head End, some signals from the Satellite Receivers 268 are conveyed by connections 286 to a Switcher 276 which conveys the signals at appropriate times via connections 274 to the Modulators and Combiner 272. The Switcher may also convey the signals by connection 278 to a Program Playback device 280 for recording and later playback through the Switcher 276 or via connection 282 to a Commercial Playback device 284 for recording and later playback through the Switcher 276.

Figure 3:
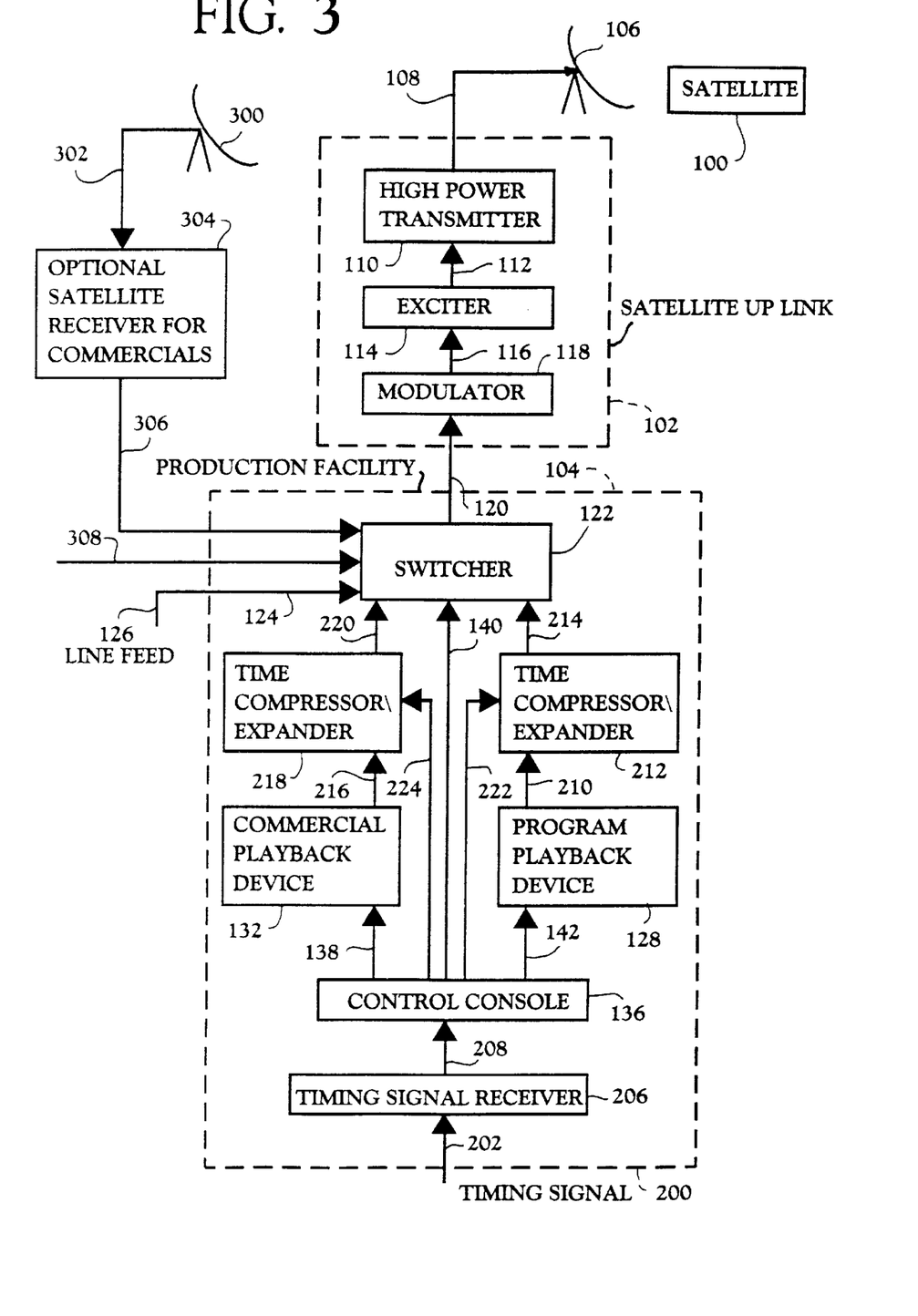
FIG. 3: A satellite uplink/Production Facility with single-hop satellite delivered commercials for precise timing.

FIG. 3 shows the satellite uplink/Production Facility of FIG. 2 with the addition of an optional single-hop satellite link for delivery of commercials with precise timing. Precise timing of the commercials can also be achieved if they are distributed from a common source via satellite 100 (or another satellite) to satellite receive antennae 300. The satellite receive antenna 300 is coupled to the satellite commercial receiver 304 via connection 302. The received commercial is coupled to the Switcher 122 via connection 306. Alternatively, the commercial could be distributed via land connection 308 consisting of wire, fiber, or radio links. The common distribution of commercials to participating sites ensures their precise timing and avoids the need for other hardware to adjust the timing of the commercials. The timing of the programming may still have to be adjusted.

Figure 4:
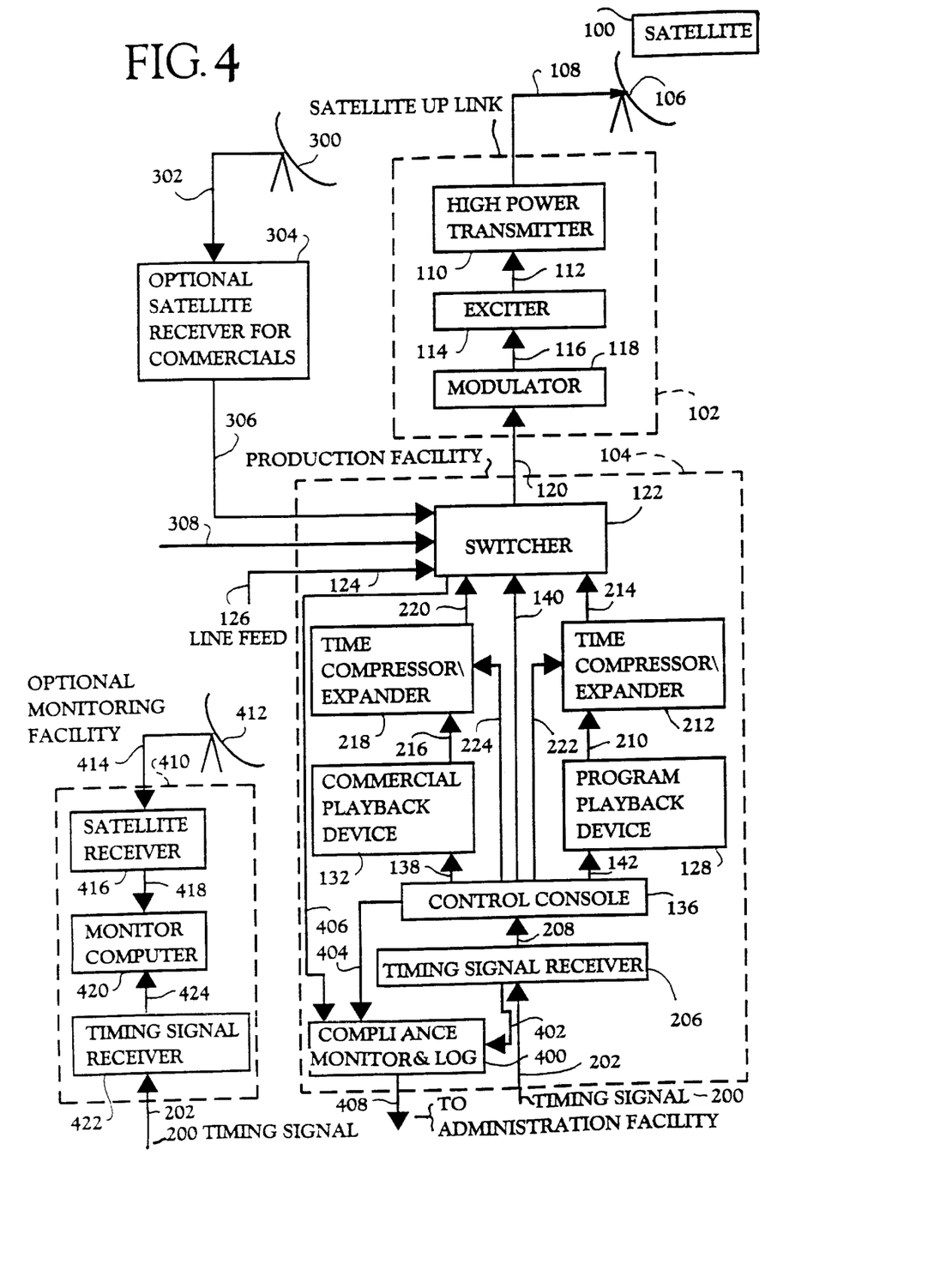
FIG. 4: A satellite uplink/Production Facility with precise commercial timing and optional signal time compression/expansion and compliance monitoring and data collection.

FIG. 4 shows a satellite uplink/Production Facility with precise commercial timing and optional signal time compression/expansion and compliance monitoring and data collection. The Compliance Monitor and Log 400 monitors and logs the timing information coupled via connection 402 from the Timing Signal Receiver 206 and the timing and status of the control console 136 via connection 404 and the timing and status of the switcher 122 via connection 406. These data are then conveyed via connection 408 to a central administrative facility for record keeping and management of the business. An optional monitoring facility 410 can be employed to further ensure compliance with the timing requirements. The optional monitoring facility 410 consist of a satellite receive antenna 412 coupled to one or more satellite receivers 416 via connections 414. A monitoring computer 420 is coupled via connection 418 to the receiver 416 and via connection 424 to the Timing Signal Receiver 422 which is also coupled to the common timing source 200 via connection 202. The monitoring computer 420 accumulates information about the timing of the commercials so that the business can be accurately managed. It will be appreciated that the signals to be monitored can be conveyed by other means such as cable, fiber, or of-air-antenna. Also, multiple Monitoring Facilities may be employed.

Furthermore, the Monitoring Facility 410 may be part of the National Synchronization Center 246 of FIG. 2a.

Figure 5:
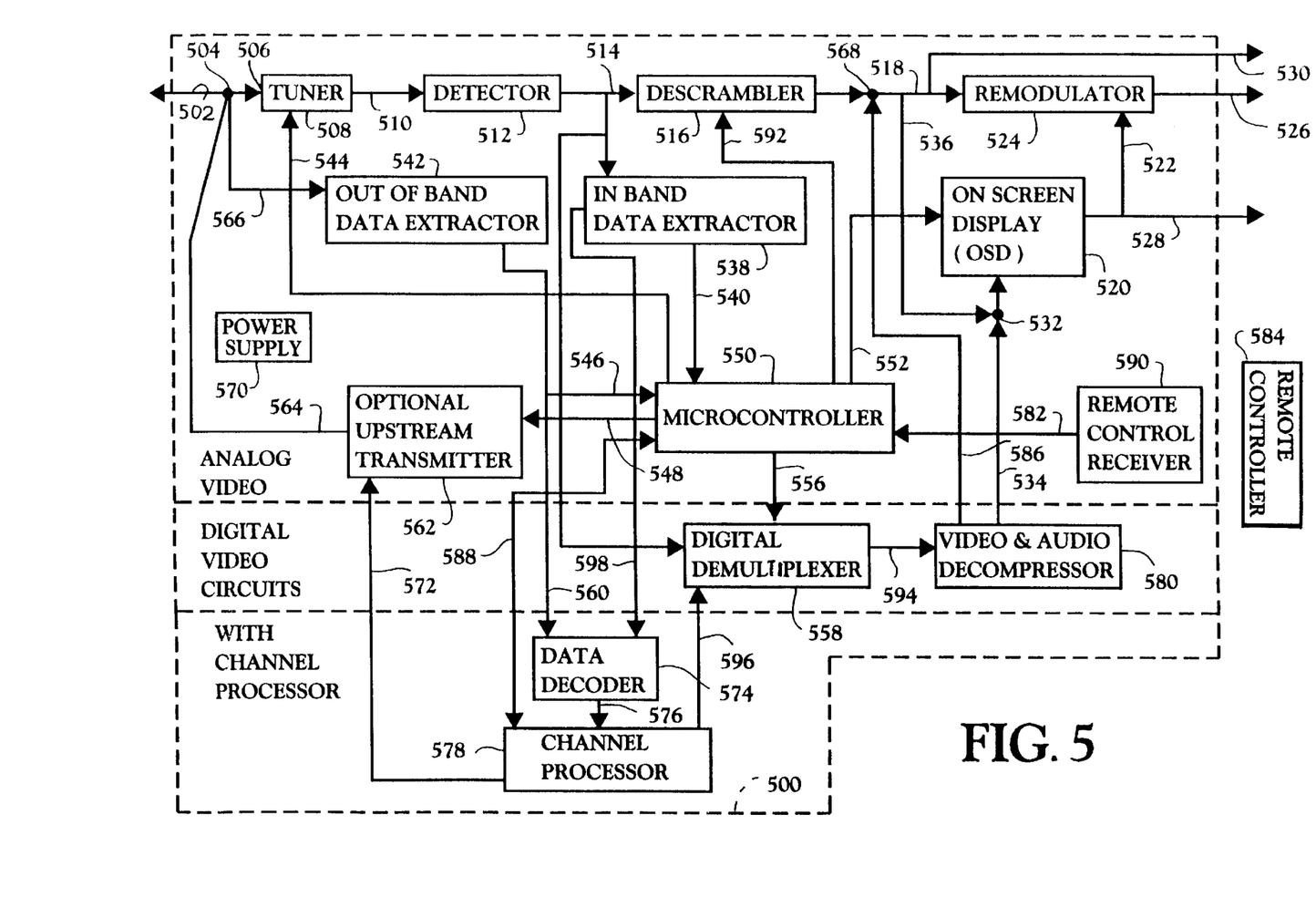
FIG. 5: A set top box with interruption suppression technology.

FIG. 5 shows a simplified block diagram of a set top box 500 as might be used in the cable industry or any other video or audio provider. Only the elements needed to describe the set top box 500 operation for the purposes of this invention are included. It will be appreciated that there are a variety of ways of implement set top boxes and that the alternate approaches in no way preclude the implementation of the present invention. The description of FIG. 5 is for illustrative purposes only and is not the only method of implementing the invention. The set top box 500 includes an analog descrambler 516 and a digital decompressor 580 and with interruption suppression technology implemented in a Channel Processor 578.

The set top box 500 is divided into three major sections. The top section processes analog video and is representative of advanced analog set top boxes currently in use in the cable industry. Similar designs are used by other video signal providers. The center section is representative of the new compressed digital video set top boxes being introduced into cable practice and for Direct Broadcasting Satellite. The bottom section contains the circuitry of this invention. That circuitry plus supporting software in the Microcontroller 550, implement the invention.

The Analog Video part of the set top box functions in the usual manner and is well understood by those skilled in the cable arts. Bi-directional cable 502 connects to the input of the set top box and conveys its broadband spectrum to a node 504. The broadband spectrum consists of multiple video, audio, and data signals modulated on carrier frequencies so that they may all be simultaneously conveyed to multiple receive sites. Node 504 allows upstream return signals to be conveyed to the cable 502 and also splits the input downstream signal so that it feeds both the Tuner 506 and the Out of Band Data Extractor 542. The Tuner 508 receives the broadband spectrum from the input cable 502 through the node 504 via connection 506. The Tuner 508 selects a single channel out of the multiple channels presented to it. In the United States, that channel consists of 6 MHz of continuous spectrum. The channel is conveyed by connection 510 to Detector 512 which converts it from a modulated signal on a carrier frequency to a signal ranging from zero Hz to 4.2 MHz. These are frequencies suitable for creating pictures on television display devices and for reproducing audio. That demodulated signal is then conveyed to a Descrambler 516 via connection 514. The Descrambler 516 reconfigures the signals under the influence of control signals conveyed to it by connection 592 from the Microcontroller 550. The video and audio signals are converted into a normal television signal if the subscriber is authorized to receive the programming. If the subscriber is not authorized to receive the signal it remains scrambled and is basically unwatchable. If the signal is from an unscrambled channel, it passes through the Descrambler 516 without change. The descrambled or unscrambled signals are conveyed to a Node 568 which allows these signals to continue on for further processing or accepts signals via connection 586 from the Video & Audio Decompressor 580 in the digital portion of the system. The digital portion is further described below. The audio portion of the signal is conveyed by connection 518 to an external terminal 530 for optional direct connection to the viewers "audio system". The audio signal also conveyed via connection 518 to Remodulator 524 which places the signal on a conventional television channel which is unoccupied in the local environment. Typically, this is channel 2 or 3.

The video portion of the output signal from Descrambler 516 is conveyed via connection 536 to a summing Node 532. Node 532 passes the analog signal to the On Screen Display unit 520. If the program was digital rather than analog, the signal would come from Video & Audio Decompressor 580 via connection 534 instead. In either case, it would pass through the On Screen Display unit 520. The On Screen Display unit 520 introduces additional graphics to the video under the influence of signals conveyed via connection 552 from the Microcontroller 550. The additional graphics include text and drawing intended to make use of the services easier and to provide supplementary information. The channel number being watched is inserted into the video image by the On Screen Display unit 520. Most modern TVs and VCRs use On Screen Displays for their channel indication rather than a separate display. This not only saves money but is considered more convenient by many consumers. The video from the On Screen Display unit 520 is conveyed to a baseband video output 528 for those subscribers who have TV receivers or monitors with baseband inputs. The signal is also conveyed by connection 522 to the Remodulator 524 so that it may be impressed upon channel 2 or 3 (or some other locally unoccupied channel) and conveyed to connector 526 for connection to and display by an ordinary TV receiver.

The input broadband spectrum frequently contains data on a different frequency from that used to carry the programming. The data may be necessary for the control of authorization of the subscribers programming. It may also contain ancillary data for the subscriber. Electronic program guide information as well as other services are carried in this manner. The other services include messaging services and supplementary information for programming. Signals for educational programs are often conveyed in this manner. This data is conveyed from the input cable 502, thru Node 504 via connection 566 to the Out of Band Data Extractor 542. The Out of Band Data Extractor 542 finds and removes the data from the input spectrum and presents it to the Microcontroller 550 for further process ing via connection 546. Data may also be carried in this manner for the purposes of this invention. If the data used for this invention is included in a out of Band signal, then the Out of Band Data Extractor 542 will convey it to the Data Decoder 57 4 via connection 560.

In a similar manner, data may be included in the program signal. This is termed In-Band Data. As one example, this data may be digital data in the Vertical Banking Interval (VBI) of the television picture. The VBI is that period of time during which the picture tube retraces back to the top of the screen. In order to prevent unpleasant diagonal white lines on the screen, the electron beam in the picture tube is turned off (blanked). This "free time" can be used to carry data. There are other portions of the video and audio signal that can be used to carry In-Band Data. The In-Band Data is available in the demodulated signal after Detector 512. It is conveyed by connection 514 to the In-Band Data Extractor 538 which processes the signal and makes available in a suitable form for Microcontroller 550 via connection 540. If the data used for this invention is also included in an In-Band Data signal, then the In-Band Data Extractor 538 will convey it to the Data Decoder 574 via connection 598.

If the set top box is used in a two way cable system, the Microcontroller 550 conveys appropriate signals via connection 548 to the Optional Upstream Transmitter 562 which prepares it for transmission up the cable to the head end. The modulated upstream signal is conveyed via connection 564 to Node 504 where it is directed up the cable connection 502. The optional upstream signals can be used to monitor the usage or the operation of the set top box. These signals can also be used for ordering programming or merchandise or responding to questions and requests from the point of program origination.

A Remote Controller 584 emits appropriate signals to a Remote Control Receiver 590 for subscriber control of the system. These signals are conveyed by connection 582 to the Microcontroller 550 where they are interpreted and appropriate action initiated. Usually, the remote control signals are infra-red. However, occasionally, radio frequency signals are used. In the distant past, acoustic signals were employed. Future systems may use voice commands.

Microcontroller 550 issues control signals via connection 544 to Tuner 508 determining the frequency to be selected. When the viewer issues requests with the Remote Controller 584, they are interpreted by the Remote Control Receiver 590 and conveyed by connection 582 to the Microcontroller 550. If the subscriber requested a channel change, that request is converted into suitable commands for the Tuner 508 and conveyed to it. If the channel is scrambled and the viewer is authorized, the Microcontroller 550 also provides information via connection 592 to the Descrambler 516 which allows it to descramble the signal. Under some circumstances, the Microcontroller 550 takes a different course of action. For example, if the viewer requests a channel which is not authorized, the Microcontroller 550 will not issue instructions to the Descrambler 592 to descramble the signal. It may instead convey signals via connection 552 to the On-Screen Display device 520 instructing it to put an appropriate on-screen message on display instead. That message may instruct the viewer on ways of subscribing to the unauthorized service. The viewer may enter further data via the remote controller 584 which is interpreted by the Remote Control Receiver 590 and conveyed via connection 582 to the Microcontroller 550. The Microcontroller then further processes the information and sends it via connection 548 to the Optional Upstream Transmitter 562 which conveys it in modulated form via connection 564 to Node 504 where it is sent upstream to the program origination site. At the program origination site, the information is processed and if the subscriber can now be authorized, a suitable In Band or Out of Band signal is returned to the set top box 500 with an address code which causes on the appropriate set top box to respond and all others to not respond. If the control is an Out of Band signal, it passes thru cable 502, Node 504, connection 566 to the Out of Band Data Extractor where it is demodulated and presented to the Microcontroller via connection 546. The Microcontroller, now suitably authorized, removes the On Screen message from the On Screen Display unit 520 by sending an appropriate signal via connection 552 and sends a suitable signal to Descrambler 516 via connection 592 instructing it to descramble the signal. If the data was sent via and In-Band Data signal, it would pass thru cable 502, Node 504, connection 506, Tuner 508, connection 510, Detector 512, and connection 514 to the In-Band Data Extractor 538 where it would be demodulated and passed to the Microcontroller 550 via connection 540. Then as in the Out of Band signal case, the Microcontroller 550 would initiate descrambling.

Another example involves parental control. If the program is of a nature that parents may not wish children to view it, it may be protected by a parental control code. When the viewer uses Remote Controller 584 to request a parentally controlled channel, the Remote Control Receiver 590 interprets the signal and conveys it via connection 582 to the Microcontroller 550 which has stored a list of the channels and/or programs which are to be parentally controlled. Rather than instructing the Tuner 508 to tune to the parentally controlled channel, the Microcontroller 550 conveys a signal via connection 552 to the On Screen Display unit 520 putting up a message informing the viewer that this is a parentally controlled channel and requesting a code. If the viewer knows the code, it is entered via the remote control 584 thru the Remote Control Receiver, thru connection 582, to the Microcontroller 550. If the code is correct, the Microcontroller 550 will remove the On Screen message by issuing a command via connection 552 to the On Screen Display unit 520 and then issue a channel change instruction via connection 544 to the Tuner 508. If the code is incorrect, either no further action is taken or the on screen message is appropriately modified.

Of course, a Power Supply 570 is included to provide operating voltages and currents for the other components of the system.

If the signals are compressed digital signals, they are further processed in the Digital Video circuits section of the set top box 500. As before, the Tuner 508 selects a channel of frequencies and conveys it via connection 510 to the Detector 512 which processes the signal and conveys it via connection 514 to the Digital Demultiplexer 558 which is controlled by signals from the Microcontroller 550 via connection 556. Digital Video compression squeezes multiple programs in the same spectrum that was previously used for just one analog channel. A method of choosing just one of those programs is required. The digital bits associated with the desired program are selected by the Demultiplexer 558 and the other bits are discarded. The selected bit stream is then conveyed via connection 594 to the Video & Audio Decompressor 580 where the signals are converted into ordinary analog video and audio signals if the subscriber is authorized to receive them. The audio signals are conveyed via connection 586 to the Node 568 where they then pass to either the output connector 530 or the Remodulator 524. The video signals are conveyed via connection 534 to the Node 532 where they then pass to the On Screen Display unit 520 for further enhancement and then on to the external video connection 528 or the Remodulator 524 for insertion into channel 2 or 3 (or some other suitable channel) and to connection 526. If the program is not authorized, Microcontroller 550 conveys instructions via connection 552 to the On Screen Display unit 520 to put up an appropriate message as described above.

The nature of the present invention is such that it can be easily and economically introduced into present set top box practice either thru the addition of a modest amount of additional circuitry and software or thru the modification of already existing circuitry and software. This will now be described. The operation of the set top box 500 is normal except that information pertaining to the channel number displayed by the On Screen Display Generator 520 is governed by the interaction of the channel Processor 578 and the Microcontroller 550 in a manner that implements an improvement of the invention.

The Channel Processor 578 stores information about which channels have the same commercial. That information is downloaded into the Channel Processor 578 from the Data Decoder 574 via connection 576. The Data Decoder 574 receives that information either from Out-of-Band Data Extractor 542 via connection 560 or from In-Band Data Extractor 538 via connection 598. The Out-of-Band Data Extractor 542 is coupled via connection 566 to a Node 504 which takes the broadband spectrum on the bi-directional input cable 502 and conveys it to the Out-of-Band Data Extractor 542. This is a commonly used approach in the cable industry for the carriage of data in available portions of the spectrum. Its principle advantage is that the data is continuously available and can have a large capacity. Alternatively and sometimes in addition, an In-Band Data Extractor 538 is used to detect auxiliary data carried in unused portions of the video signal. A common example of this is data carried in the Vertical Blanking Interval (VBI). The VBI is used to carry data such as Teletext or Captioning for the Hearing Impaired. Either method can be used to convey data to the Channel Processor 578 regarding the list of channels which are participating and carrying the same commercial.

This list can be downloaded at any time prior to the display of the commercial.

When the viewer uses his Remote control 584 to request a channel change, a signal is transmitted to the Remote Control Receiver 590. The signal is conveyed via connection 582 to the Microcontroller 550 and then via bi-directional connection 588 to the Channel Processor. If the newly requested channel is on the previously downloaded list and therefore has the same commercial as the currently displayed channel, the Channel Processor 578 temporarily stores the new channel number and also causes the On Screen Display Generator 520 to display the new number. However, the tuner 508 continues to tune the current channel containing the commercial. This avoids any disruption in the display of the commercial. When the commercial is over, the Channel Processor conveys a signal to the microcontroller 550 via bi-directional connection 588 instructing it to send a signal via connection 544 to the Tuner 508 causing it to go to the new channel.

If the channel is digitally compressed, the Channel Processor 578 instructs the Digital Demultiplexer 558 via connection 596 to continue selecting the same commercial while it instructs the Microcontroller 550 via bi-directional connection 588 to send the new channel indication to the On Screen Display 520. This continues until the commercial is completed. Then, the Channel Processor 578 instructs the Microcontroller 550 via bi-directional connection 588 to send signals to the Tuner 508 via connection 544 to go to a new frequency if necessary and the Channel Processor 578 conveys instructions via connection 596 to the Digital Demultiplexer 558 to select the new bit stream for the new program. Alternatively, the instructions conveyed by the Channel Processor 578 via connection 596 to the Digital Demultiplexer 558 could have been conveyed by a different route. The Channel Processor 578 could send instructions via bi-directional connection 588 to Microcontroller 550 which then relays them to the Digital Demultiplexer 558 via connection 556. Either process is acceptable.

In the event the subscriber is doing a channel scan and channels which do not include the commercial are scanned, the system can be instructed to retain the selected commercial and not attempt to make a split second presentation from the scanned channel. If the scanning enters a range where multiple channels are not participating, then it may be necessary to display the video on the non-participating channels.

Data pertaining to the commercials watched (and other data) can be accumulated in the Channel Processor and then conveyed at appropriate times via connection 572 to the Optional Upstream Transmitter 562 where it is modulated onto a suitable carrier, conveyed via connection 564 to Node 504 and upstream on the cable 502.

An alternate embodiment of the invention avoids the storage of lists in the Channel Processor. When the viewer issues a channel change request from the Remote Controller 584, it is conveyed from the Remote Control Receiver 590 via connection 582 to the Microcontroller 550. The Microcontroller 550 may either directly convey the signal to the Optional Upstream Transmitter 562 or convey it via bi-directional connection 588 to the Channel Processor 578 which then conveys it via connection 572 to the Optional Upstream Transmitter 562. The Optional Upstream Transmitter 562 modulates the signal on an appropriate carrier and conveys it via connection 564 to Node 504 which sends it upstream on cable 502. The programming site then determines if the same commercial is present on the current channel and on the newly requested channel. If the same commercial exists on both channels, either an addressed In-Band or an addressed Out of Band signal is sent to the viewers "set top box" 500 where it is appropriately processed and conveyed to the Microcontroller 550 which takes appropriate action. If the same commercial is on both channels, only the channel display is changed. If different commercials are on the two channels, both the display and the Tuner 508 and if digital, the Demultiplexer 558 are changed as well.

The Data Decoder 574 consists of logical circuits which determine if In-Band Data or Out-of-Band Data are intended for the Channel Processor 578. If the data is intended for the Channel Processor 578, it is stored in the Data Decoder 574 and at an appropriate time conveyed to the Channel Processor 578 via connection 576. The Channel Processor 578 can be implemented with either specially designed logic or as software in a microcontroller or microprocessor. The economics in effect at the time of implementation will dictate which is the more appropriate approach. Other factors determining the approach taken include whether the Channel Processor 578 is to be added to an existing design which may be at capacity and not be able to absorb these functions or whether the Channel Processor 578 is part of a new design which will allow it to be fully integrated with other functions and more economically accommodated.

The Channel Processor 578 consists of Random Access Memory, RAM, Read Only Memory, ROM, and logic and/or computing circuits all commonly available and well understood in the digital circuit design arts. The interconnection of these circuits in forms such as used in this invention are also very well understood. Software to implement these functions is also a commonly understood art.

It will be appreciated that the Data Decoder 574 is similar in function and implementation to portions of the Out of Band Data Extractor 542 and the In Band Data Extractor 538. It will also be appreciated that the Channel Processor 578 is similar in function and implementation to portions of the Microcontroller 550. As a consequence, the functions of the Data Decoder 574 can be combined with those of the Out of Band Data Extractor 542 and the In Band Data Extractor 538. Similarly, the functions of the Channel Processor 578 can be combined with the Microcontroller 550.

We claim:

1. A TV commercial control system for the synchronization of a commercial across multiple channels including means for relatively precise commercial reception for viewing at a TV receiver whereby a commercial is simultaneously aired with sufficient precision to appear substantially simultaneously to the viewer of the TV receiver despite changing channels;

a command center for controlling commercial delivery to the TV receiver for the synchronization of the commercial across multiple channels.

2. The viewer system of claim 1 further including a means for signal time compression/expansion.

3. The system of claim 1 including a satellite uplink for coupling to a satellite, a studio coupled with the satellite uplink, and an antenna extending from the satellite uplink for feeding signals to the satellite.

4. The system of claim 3 wherein the satellite uplink includes a high power transmitter coupled with the antenna, an exciter possessing predetermined signal level and impedance levels for operating the high power transmitter, and a modulator for feeding the exciter.

5. The system of claim 3 wherein the studio comprises a switcher for combining video and audio signals from a variety of sources coupled with the satellite uplink, a control console influencing the sources, the sources including a program playback device and commercial playback device.

6. The system of claim 1 further including a means for signal time compression/expansion;
including a satellite uplink for coupling to a satellite, a studio coupled with the satellite uplink, and an antenna extending from the satellite uplink for feeding signals to the satellite;
the satellite uplink includes a high power transmitter coupled with the antenna, an exciter possessing predetermined signal level and impedance levels for operating the high power transmitter, and a modulator for feeding the exciter;
the studio comprises a switcher for combining video and audio signals from a variety of sources coupled with the satellite uplink, a control console influencing the sources, the sources including a program playback device and commercial playback device.

7. The system of claim 1 wherein the means for precise commercial timing includes a common timing source.

8. The system of claim 7 wherein a multiple of studio sites are provided, and the common timing source is coupled with each site for synchronizing commercials.

9. The system of claim 8 wherein each studio site includes timing signal receivers coupled to the common timing source for receiving the signal therefrom for further use at each site.

10. The system of claim 7 wherein a studio includes a timing signal receiver coupled with the common timing source for receiving the signal therefrom for further use at the studio.

11. The system of claim 10 wherein the studio comprises a switcher for combining video and audio signals from a variety of sources coupled with a satellite uplink, a control console influencing the sources, the sources including a program playback device and commercial playback device;
further including a means for signal time compression/expansion and coupled with the commercial playback device and the program playback device to take signals previously loaded therein and play them back at appropriate speed—precisely for a time constraint.

12. The system of claim 1 wherein a single-hop satellite link means is provided for delivery of commercials with precise timing.

13. The system of claim 1 wherein a studio is provided and comprises a switcher for combining video and audio signals from a variety of sources coupled with a satellite uplink, a control console influencing the sources, the sources including a program playback device and commercial playback device;
wherein a single-hop satellite link means is provided for delivery of commercials with precise timing added to the switcher.

14. The system of claim 1 wherein a compliance monitoring and data collection means is provided for monitoring and logging timing information.

15. The system of claim 14 wherein an administration facility receives the timing information for record keeping and management.

16. The system of claim 15 wherein a further monitoring means is provided for monitoring the timing of commercials.

17. The system of claim 1 wherein a monitoring means is provided for monitoring the timing of commercials.

18. The system of claim 1 wherein control means are provided to avoid interruption in commercials appearing on multiple channels during channel changing.

19. The system of claim 1 wherein a control means is provided and includes a set top box comprising:
analog video circuitry for receiving analog TV signals;
compressed digital video circuitry coupled thereto for receiving digital TV signals;
a channel processor means for storing information about which channels have the same prerecorded commercial so that when a new channel is requested by the viewer from a viewing channel and that channel has the same commercial, the commercial is completed on the receiving channel before the new channel is displayed.

20. The system of claim 1 wherein the command center downloads the commercial at a selected location and synchronization means for airing the downloaded commercial a predetermined time on the channels.

21. The system of claim 20 wherein the synchronization means includes a timing means for airing the commercial at a predetermined time on the channels.

22. The system of claim 20 wherein the command center transmits the command signal to the synchronization means for airing the commercial at a predetermined time on the channels.

23. A set top box comprising:
analog video circuitry for receiving analog TV signals;
compressed digital video circuitry coupled thereto for receiving digital TV signals;
a channel processor means for storing information about which channels have the same prerecorded commercial so that when a new channel is requested by the viewer from a viewing channel and that channel has the same commercial, the commercial is completed on the receiving channel before the new channel is displayed.

24. The set top box of claim 23 wherein a tuner and a microcontroller coupled therewith is provided and in case of analog signals, the processor means controls the tuner through the microcontroller to restrict changing of channels when the same commercial is being transmitted to the channels.

25. The set top box of claim 24 wherein means are provided for changing channels upon completion of the commercial.

26. The set top box of claim 23 wherein in case of digital signals, multiple programs are contained within the same channel and the channel processor means determines which of the programs will be selected.

27. The set top box of claim 26 wherein a digital demultiplexer is provided and the processor means causes the digital demultiplexer to select appropriate digital signals.

28. The set top box of claim 23 wherein the selection channel is displayed following channel requested by the viewer and after the commercial of the previous channel is completed before the channel is changed.

* * * * *